(12) United States Patent
Ghaeini et al.

(10) Patent No.: US 11,294,942 B2
(45) Date of Patent: Apr. 5, 2022

(54) QUESTION GENERATION

(71) Applicant: KONINKLIJKE PHILIPS N.V., Eindhoven (NL)

(72) Inventors: Reza Ghaeini, Malden, MA (US); Sheikh Sadid Al Hasan, Cambridge, MA (US); Oladimeji Feyisetan Farri, Cambridge, MA (US); Kathy Mi Young Lee, Westford, MA (US); Vivek Varma Datla, Ashland, MA (US); Ashequl Qadir, Melrose, MA (US); Junyi Liu, Windham, NH (US); Adi Prakash, Waltham, MA (US)

(73) Assignee: KONINKLIJK EPHILIPS N.V., Eindhoven (NL)

( * ) Notice: Subject to any disclaimer, the term of this patent is extended or adjusted under 35 U.S.C. 154(b) by 152 days.

(21) Appl. No.: 16/334,135

(22) PCT Filed: Sep. 29, 2017

(86) PCT No.: PCT/EP2017/074818
§ 371 (c)(1),
(2) Date: Mar. 18, 2019

(87) PCT Pub. No.: WO2018/060450
PCT Pub. Date: Apr. 5, 2018

(65) Prior Publication Data
US 2020/0183963 A1    Jun. 11, 2020

Related U.S. Application Data

(60) Provisional application No. 62/401,293, filed on Sep. 29, 2016.

(51) Int. Cl.
*G06F 16/332* (2019.01)
*G06F 16/33* (2019.01)
(Continued)

(52) U.S. Cl.
CPC ...... *G06F 16/3329* (2019.01); *G06F 16/3334* (2019.01); *G06F 40/284* (2020.01);
(Continued)

(58) Field of Classification Search
USPC .................................................. 704/7–10
See application file for complete search history.

(56) References Cited

U.S. PATENT DOCUMENTS 8,175,873 B2   5/2012   Di Fabbrizio et al.
8,566,090 B2   10/2013  Di Fabbrizio et al.
(Continued)

FOREIGN PATENT DOCUMENTS

WO    2016032864 A1    3/2016

OTHER PUBLICATIONS

Serban, et al., "Generating Factoid Questions With Recurrent Neural Networks: The 30M Factoid Question-Answer Corpus", Cornell University, Computer Science, Submitted on Mar. 22, 2016 (last revised May 29, 2016, 13 pages.
(Continued)

*Primary Examiner* — Leonard Saint Cyr
(74) *Attorney, Agent, or Firm* — Micah Shalom-Kesselman

(57) ABSTRACT

Methods and systems for generating a question from free text. The system is trained on a corpus of data and receives a tuple consisting of a paragraph (free text), a focused fact, and a question type. The system implements a language model to find the most optimal combination of words to return a question for the paragraph about the focused fact.

15 Claims, 7 Drawing Sheets

(51) Int. Cl.
   G06F 40/284    (2020.01)
   G06F 40/40     (2020.01)
   G06N 3/04      (2006.01)
   G06N 3/08      (2006.01)
(52) U.S. Cl.
   CPC .......... G06F 40/40 (2020.01); G06N 3/0454
                 (2013.01); G06N 3/08 (2013.01)

(56) References Cited

U.S. PATENT DOCUMENTS

| | | | |
|---|---|---|---|
| 8,612,204 | B1 | 12/2013 | Uszkoreit et al. |
| 8,738,375 | B2 | 5/2014 | Ljolje et al. |
| 9,020,806 | B2* | 4/2015 | Zweig ............... G06F 40/20 704/9 |
| 9,037,464 | B1 | 5/2015 | Mikolov et al. |
| 9,330,084 | B1* | 5/2016 | Kadambi ............ G06F 40/56 |
| 10,606,846 | B2* | 3/2020 | Li ..................... G06N 3/0445 |
| 2014/0156260 | A1* | 6/2014 | Zweig ............... G06F 40/20 704/9 |
| 2014/0229158 | A1 | 8/2014 | Zweig et al. |
| 2014/0278341 | A1 | 9/2014 | Ranjan et al. |
| 2014/0279763 | A1 | 9/2014 | Madnani et al. |
| 2014/0358537 | A1 | 12/2014 | Gilbert et al. |
| 2016/0063879 | A1* | 3/2016 | Vanderwende ..... G06F 16/3329 434/322 |
| 2016/0117314 | A1 | 4/2016 | Kantor et al. |
| 2016/0125872 | A1 | 5/2016 | Golipour et al. |
| 2016/0350653 | A1* | 12/2016 | Socher ................. G06N 5/04 |
| 2016/0358072 | A1* | 12/2016 | Hermann ............ G06N 3/0472 |
| 2017/0103324 | A1* | 4/2017 | Weston ............... G06N 5/04 |
| 2019/0355267 | A1* | 11/2019 | Vanderwende ..... G06F 16/3329 |
| 2020/0042597 | A1* | 2/2020 | Wu ..................... G06F 16/3329 |

OTHER PUBLICATIONS

Yuan, et al., "Machine Comprehension by Text-to-Text Neural Question Generation", Proceedings of the 2nd Worshop on Representation Learning for NLP, Vancouver, Canada, Aug. 3, 2017, pp. 15-25.
Subramanian, et al, "Neural Models for Key Phrase Detection and Question Generation", Cornell University, Computer Science, Submitted on Jun. 14, 2017 (last revised May 30, 2018), 7 pages.
Zhou, et al., "Neural Question Generation from Text: A Preliminary Study", Cornell University, Computer Science, submitted on Apr. 6, 2017 (last revised Apr. 18, 2017) 6 pages.
Yang, et al., "Semi-Supervised QA with Generative Domain-Adaptive Nets", Conference Proceedings of the 55th Annual Meeting of the Association for Computational Linguistics, Apr. 22, 2017, vol. 1, 11 pages.
Agarwal, et al. "Automatic Question Generation Using Discourse Cues", In Proceedings of the 6th Workshop on Innovative Use of NLP for Building Educational Applications, pp. 1-9.
Andrenucci, et al. "Automated Question Answering: Review of the Main Approaches", In Proceedings of the 3rd International Conference on Information Technology and Applications (ICITA'05), Sydney, Australia, pp. 514-519.
Bahdanau, et al., "Neural Machine Translation by Jointly Learning to Align and Translate", Published as a conference paper at ICLR 2015, pp. 1-15.
Boyer, et al., "Proceedings of QG2010: The Third Workshop on Question Generation", Jun. 18, 2010, Pittsburgh: questiongeneration.org., 95 pages.
Brown, et al., "Automatic Question Generation for Vocabulary Assessment", In Proceedings of the conference on Human Language Technology and Empirical Methods in Natural Language Processing, Vancouver, British Columbia, Canada, 2005, 8 pages.
Chen, et al., "Generating Questions Automatically from Informational Text", In Proceedings of the 2nd Workshop on Question Generation (AIED 2009), pp. 17-24.
Clark, et al., "Better Hypothesis Testing for Statistical Machine Translation: Controlling for Optimizer Instability", In Proceedings of ACL-HLT, pp. 176-181.
Echihabi, et al., "A Noisy-channel Approach to Question Answering", In Proceedings of the 41st Annual Meeting on Association for Computational Linguistics—vol. 1, pp. 16-23. ACL.
Graesser, et al., "Intelligent Tutoring Systems with Conversational Dialogue", 2001 AI Magazine, 22(4):39-51. (Abstract).
Heilman, et al., "Extracting Simplified Statements for Factual Question Generation", In Proceedings of the Third Workshop on Question Generation, Language Technologies Institute, Carnegie Mellon University, Pittsburgh, PA, 10 pages.
Heilman, et al., "Good Question! Statistical Ranking for Question Generation", In Human Language Technologies: The 2010 Annual Conference of the North American Chapter of the Association for Computational Linguistics, pp. 609-617.
Hickl, et al., "Experiments with Interactive Question-Answering", 2005, In In Proceedings of the 43rd Annual Meeting of the Association for Computational Linguistics (ACL'05), pp. 60-69.
Lavie, et al., "METEOR: An Automatic Metric for MT Evaluation with High Levels of Correlation with Human Judgments", 2007, In Proceedings of the Second Workshop on Statistical Machine Translation, pp. 228-231.
Madnani, et al., "Reexamining Machine Translation Metrics for Paraphrase Identification", 2012, In Proceedings of NAACLHLT, pp. 182-190.
Mannem, et al., "Question Generation from Paragraphs at Upenn", 2010, In Proceedings of the Third Workshop on Question Generation, 8 pages.
McGough, et al., "A Web-based Testing System with Dynamic Question Generation", 2001, In ASEE/IEEE Frontiers in Education Conference, 2 pages (Abstract).
Mitkov, et al., "Computer-aided Generation of Multiple-Choice Tests" 2003, In Proceedings of the HLT-NAACL 03 workshop on Building educational applications using natural language processing—vol. 2, pp. 17-22.
Papineni, et al., "BLEU: A Method for Automatic Evaluation of Machine Translation", IBM Research Report, Computer Science, Sep. 17, 2001, 10 pages.
Rajpurkar, et al., "Squad: 100, 000+ questions for machine comprehension of text", Proceedings of the 2016 Conference on Empirical Methods in Natural Language Processing, Austin, Texas, Nov. 1-5, 2016, pp. 2383-2392.
Rus, et al., "The Question Generation Shared Task and Evaluation Challenge", Proceedings of the 13th European Workshop on Natural Language Generation (ENLG), Sep. 2011, pp. 318-320.
Rus, et al., "Experiments on Generating Questions About Facts", 2007, In Proceedings of the 8th International Conference on Computational Linguistics and Intelligent Text Processing, pp. 444-455. Springer-Verlag. (Abstract).
Wang, et al., "Automatic Question Generation for Learning Evaluation in Medicine", ICWL 2007, LNCS 4823, 2008, pp. 242-251.
Wubben, et al., "Paraphrase Generation As Monolingual Translation: Data and Evaluation", 2010, In Proceedings of INLG, pp. 203-207.

* cited by examiner

QUESTION GENERATION

CROSS-REFERENCE TO PRIOR APPLICATIONS

This application is the U.S. National Phase application under 35 U.S.C. § 371 of International Application No. PCT/EP2017/074818, filed on Sep. 12, 2017, which claims the benefit of Provisional Application Ser. No. 62/401,293, filed Sep. 29, 2016. These applications are hereby incorporated by reference herein, for all purposes.

TECHNICAL FIELD

Embodiments described herein generally relate to systems and methods for generating questions and, more particularly but not exclusively, to systems and methods for generating questions from free text using deep learning networks.

BACKGROUND

Search engines cannot always satisfy an end user's desire to have more direct access to relevant documents or information. Question answering (QA) systems have attempted to improve this experience by directly retrieving relevant answers to natural language questions.

However, one of the main requirements of a QA system is that it must receive a concise and well-described question as an input to generate the best possible answer as an output. Prior studies have revealed that humans do not always ask succinct questions on a specific topic of interest. For example, variations in expressive abilities among users may impact the ability of QA systems to "understand" the input queries and therefore the QA system may not truly understand the information that a user is seeking. Accordingly, the performance of the QA system may be adversely affected.

Using existing search engines is therefore time consuming and often unsatisfying as they are unable to handle complex queries well. Accordingly, accurate answers may not be returned. While existing QA systems have addressed some of these limitations, they generally do not perform well with questions that are related to many topics of interest and that may be unrelated.

A need exists, therefore, for question generation systems and methods that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of generating a question from text. The method includes receiving textual content using an interface, receiving a factual statement associated with the textual content using the interface, and generating, using a processor executing instructions stored on a memory to provide a question generator module, a question from the textual content relating to the factual statement.

In some embodiments, the method further includes receiving a question type related to the textual content using the interface.

In some embodiments, the factual statement consists of a plurality of words, and the method further comprises mapping, using a processor executing instructions stored on a memory to provide a fact embedder module, a sequence of the plurality of words to word embeddings. In some embodiments, the method further includes processing the word embeddings of the fact embedder module using a first gated recurrent unit to result in a set of computed weights. In some embodiments, the method further includes providing the received textual content to a second bidirectional fact-based gated recurrent unit whose weighting is determined by the set of computed weights. In some embodiments, the method further includes providing output of the second bidirectional fact-based gated recurrent unit to at least one attention generator, each attention generator computing normalized weights for all sequences of the second gated recurrent unit. In some embodiments, the method further includes using the computed normalized weights and a third unidirectional fact-based gated recurrent unit to generate a plurality of words forming the question. In some embodiments, the at least one attention generator utilizes the set of computed weights in determining the normalized weights. In some embodiments, the second bidirectional fact-based gated recurrent unit comprises a convolutional neural network feeding forward into a plurality of recurrent neural networks.

According to yet another aspect, embodiments relate to a system for generating a question from text. The system includes an interface for receiving textual content and a factual statement associated with the textual content, and a processor executing instructions stored on a memory to provide a question generator module configured to generate a question from the textual content relating to the factual statement.

In some embodiments, the interface is further configured to receive a question type related to the textual content.

In some embodiments, the factual statement consists of a plurality of words, and the system further includes a processor executing instructions stored on a memory to provide a fact embedder module configured to map a sequence of the plurality of words to word embeddings. In some embodiments, the system further includes a first gated recurrent unit configured to process the word embeddings into a set of computed weights. In some embodiments, the system further includes a second bidirectional fact-based gated recurrent unit configured to receive the textual content whose weighting is determined by the set of computed weights. In some embodiments, the system further includes at least one attention generator configured to compute normalized weights for sequences outputted by the second bidirectional fact-based gated recurrent unit. In some embodiments, the system further includes a third unidirectional fact-based gated recurrent unit configured to generate a plurality of words forming the question using the normalized weights. In some embodiments, the at least one attention generator utilizes the set of computed weights in computing the normalized weights. In some embodiments, the second bidirectional fact-based gated recurrent unit comprises a convolutional neural network feeding forward into a plurality of recurrent neural networks.

In some embodiments, the question generator module receives input that is a concatenation of the factual statement and a paragraph. In some embodiments, the system further includes an attention generator that considers the factual statement and previous hidden states of the question generator module. In some embodiments, the question generator module includes an encoder and a decoder, and the question generator module uses a single representation of the factual statement for the encoder and the decoder.

In some embodiments, the question generator module includes an encoder and a decoder, and an input to the decoder is the element-wise product of an encoder output and an extracted fact representation from the encoder.

According to yet another aspect, embodiments relate to a computer readable medium containing computer-executable instructions for performing a method of generating a question from text. The medium includes computer-executable instructions for receiving textual content using an interface; computer-executable instructions for receiving a factual statement associated with the textual content using the interface, and computer-executable instructions for generating, using a processor executing instructions stored on a memory to provide a question generator module, a question from the textual content relating to the factual statement.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
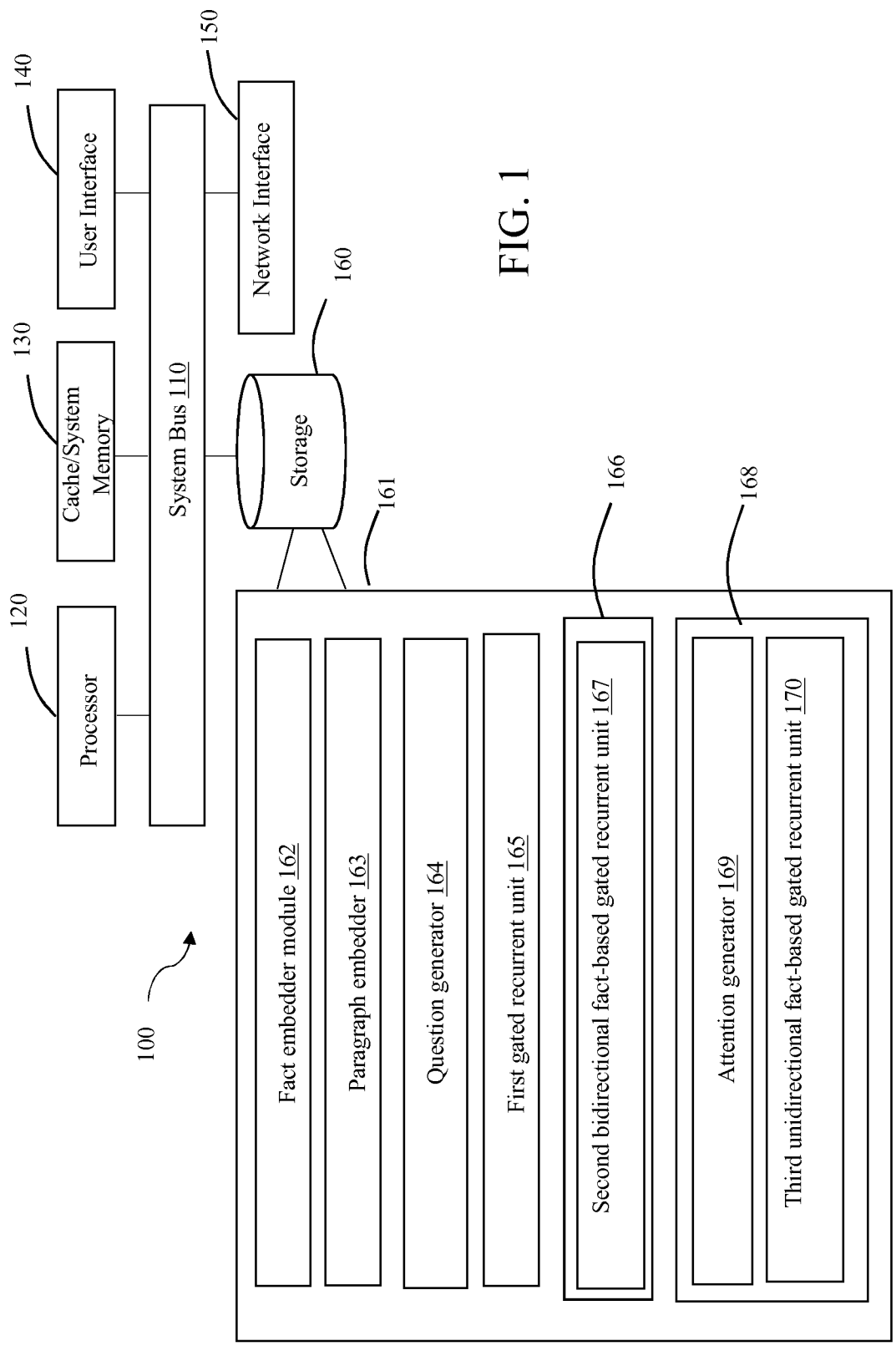
FIG. 1 illustrates a system for generating a question from text in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of various embodiments of systems and methods described herein utilize a novel deep learning-based question generation solution to generate relevant questions from textual content (e.g., a paragraph about specific topic(s) of interest). Various embodiments use associated focused factual statements and question types to generate the relevant question(s).

Specifically, the proposed models may use a novel attention-based recurrent neural network (RNN) encoder-decoder architecture with control gates for focused facts and question types. The deep RNN in accordance with various embodiments can look back on more than just previously generated words and/or characters to decide which word and/or characters to generate next as part of the generated question. Various embodiments described herein may also use a convolutional neural network (CNN) with multiple window sizes to generate phrase embeddings based on, for example, the context span of the underlying sentence in the source paragraph.

Another novel component of various embodiments described herein is the use of a language model on top of a softmax layer. This enables the model to find an appropriate combination of words rather than just using the most probable word at each position. Accordingly, the language model can generate natural language questions.

Features of various embodiments described herein can be implemented in a variety of applications. For example, features of the systems and methods described herein can create question suggestions in search engines or conversational dialogue systems. They can also be used to generate clarification questions/decompositions from a complex question or scenario (e.g., to better understand patient complaints, etc.). They can further be used to generate question answering corpus and perform educational assessments (e.g., as part of a tutoring system).

Methods and systems of various embodiments described herein may receive, as an input, a 3-tuple comprising a source text (e.g., a paragraph of information), a focused factual statement describing the topic of the question to be generated, and an indication of the question type. In some embodiments, the method and system may then create embeddings of both the source text and the focused fact. These embeddings, along with the question type, are fed as inputs into a question generator module that includes a trained RNN that generates a sequence of word embeddings that represent the output question. A language module may also translate the generated embeddings into natural language.

FIG. 1 illustrates a system 100 for generating a question from text in accordance with one embodiment. As shown, the system 100 includes a processor 120, memory 130, a user interface 140, a network interface 150, and storage 160 interconnected via one or more system buses 110. It will be understood that FIG. 1 constitutes, in some respects, an abstraction and that the actual organization of the system 100 and the components thereof may differ from what is illustrated.

The processor 120 may be any hardware device capable of executing instructions stored on memory 130 or storage 160 or otherwise capable of processing data. As such, the processor 120 may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The user interface 140 may include one or more devices for enabling communication with a user. For example, the user interface 140 may include a display, a mouse, and a keyboard for receiving user commands. In some embodiments, the user interface 140 may include a command line interface or graphical user interface that may be presented to a remote terminal via the network interface 150.

The user interface 140 may present an agent in the form of an avatar to communicate with a user. If the user is a child, for example, the avatar may be presented as a cartoon character to make the user feel more comfortable. The displayed agent may of course vary and depend on the application.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate.

For example, the storage 160 may include a question generator module 161. The question generator module 161 may include a fact embedder module 162, a paragraph embedder 163, a question generator 164, and a first gated recurrent unit 165. The question generator module 161 may further include an encoder 166 with a second bidirectional fact-based gated recurrent unit 167 and a decoder 168 with attention generator(s) 169, and a third gated recurrent unit 170. This illustration of the question generator module 161 is merely exemplary and it is contemplated that the system 100, as well as the question generator module 161, may include components in addition to or in lieu of those shown in FIG. 1.

The system 100 and, namely, the question generator module 161 may be trained on any appropriate corpus of language data. For example, one embodiment of the system 100 may use the Stanford Question Answering Dataset (SQuAD). SQuAD was originally used as a reading comprehension dataset consisting of over 100,000 question-answer pairs. The questions were derived from over 23,000 short paragraphs curated from a collection of over 5,000 Wikipedia articles, and the answer to each question is a segment of text from the corresponding paragraph.

The paragraphs may be used as the source, the answers may be used as the focused factual statements, and the corresponding question may be used as the target to train the question generator module 161. The SQUAD dataset also contains different question types (e.g., "what" questions, "when" questions, "how" questions, etc.) about domains such as math, sports, biographies, events, etc.

To train the question generator module 161, tuples of (paragraphs, questions, and answers) from SQuAD may be used. From the entire SQUAD dataset, randomly selected portions of the data may be selected to be used as the training set, development set, and testing set, respectively. It follows that the same paragraph may have different corresponding facts and target questions in the training and testing sets.

Figure 2:
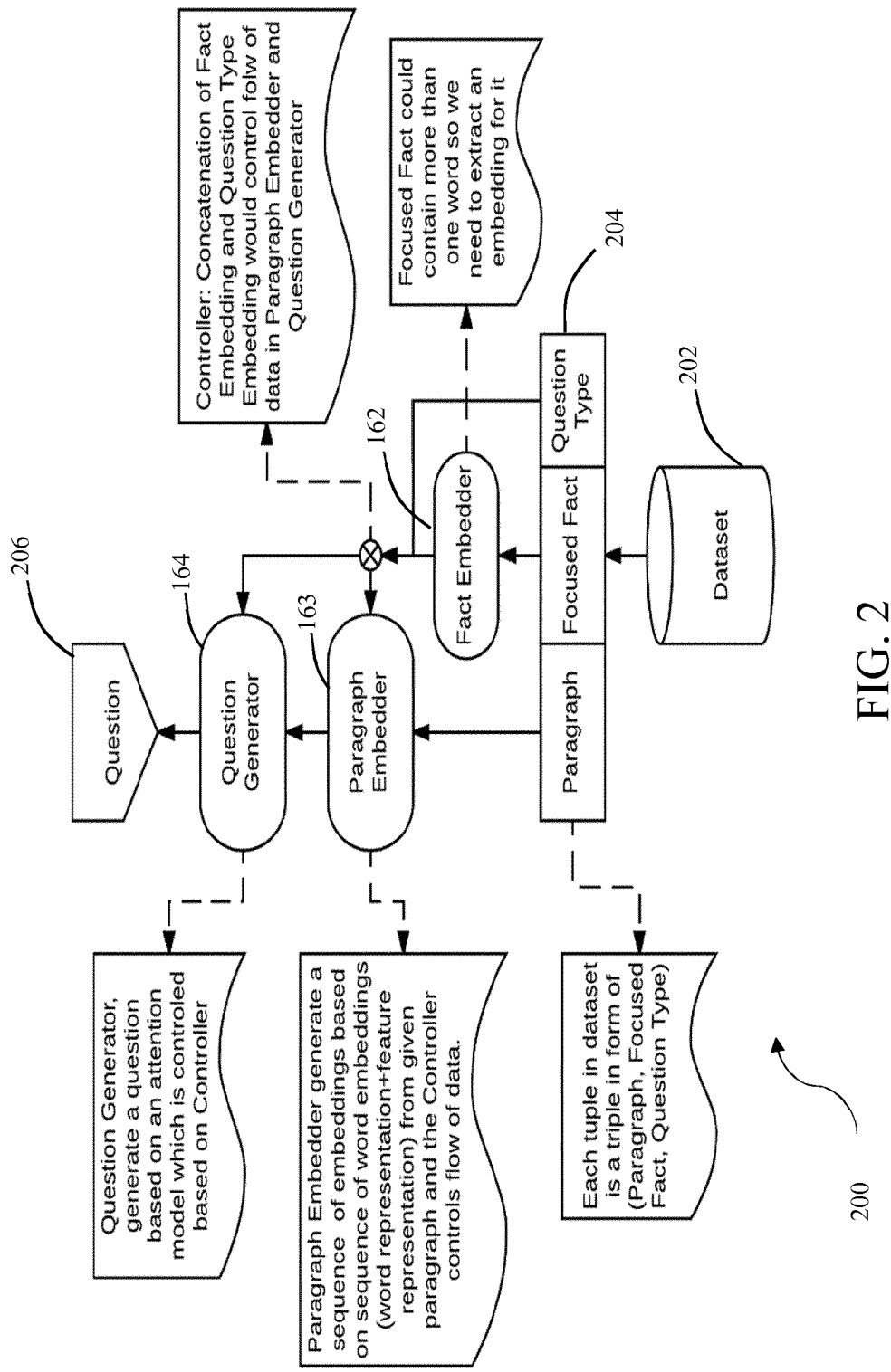
FIG. 2 illustrates the workflow of operation of the system of FIG. 1 in accordance with one embodiment.

FIG. 2 illustrates the workflow 200 of the question generator module 161 of FIG. 1 in accordance with one embodiment. As mentioned previously, a dataset 202 or other input mechanism may provide a tuple 204 comprising a source paragraph, a focused fact, and a question type.

The focused fact may be communicated to the fact embedder module 162 for embedding since the focused fact may be represented by more than word. The question type may indicate the type of question to be generated (e.g., a "what" question, a "where" question, a "when" question, etc.).

The paragraph (or other free text) may be communicated to the paragraph embedder 163 for embedding. The paragraph embedder 163 may generate a sequence of embeddings for words from the paragraph. The output of the paragraph embedder 163 may be a concatenation of each window's output.

The question generator 164 may include or otherwise be configured with the encoder 166 and decoder 168 that implement a bi-directional recurrent neural network (RNN). The output of the question generator 164 is the generated question 206 about the focused fact.

Figure 3:
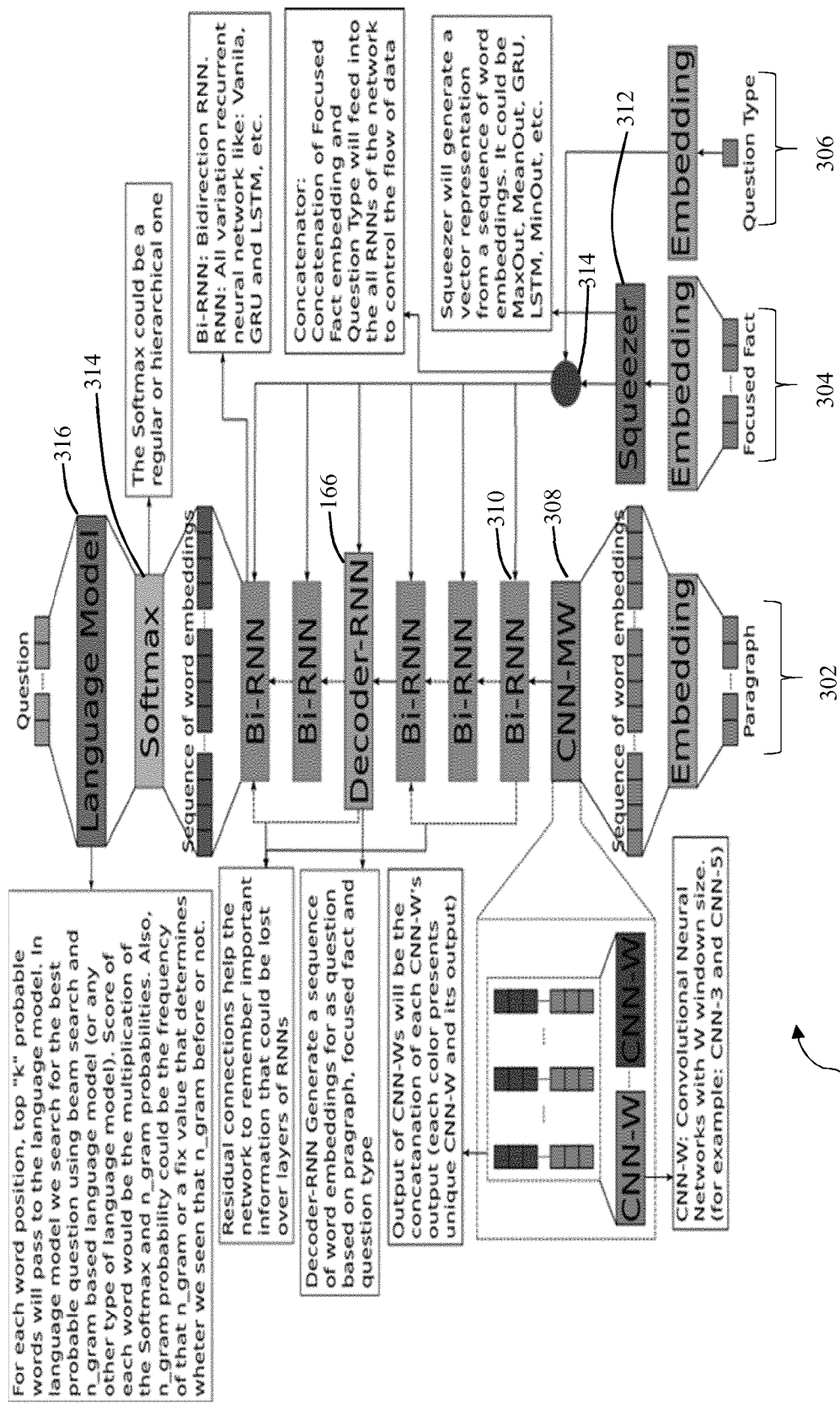
FIG. 3 illustrates a more detailed view of operation of the system of FIG. 1 in accordance with one embodiment.

FIG. 3 depicts a more detailed workflow 300 of the question generator module 161 in accordance with one embodiment. As stated previously, the input into the question generator module 161 is a tuple including a paragraph 302 (i.e., free text), a focused-fact 304, and a question type 306.

The paragraph 302 may be fed into a convolutional neural network (CNN) 308. The CNN 308 may use windows of various sizes $W_s$ to capture sequences of words from the paragraph 302. In other words, a CNN window $W_s$ may capture all words of the source text by capturing smaller sequences of words individually. The embeddings may therefore be generated based on the context span of the underlying sentence. Accordingly, the CNN 308 provides a rich embedding solution.

The output of the CNN may be the concatenation of each CNN's window's output. This output may then be fed into a plurality of recurrent neural networks 310 implemented by the question generator 164.

The focused fact 304 may also be embedded in various embodiments (e.g., if the focused factual statement consists of more than one word). The embedded focused fact may be communicated to a squeezer module 312 that generates a vector representation from the sequence of word embeddings. The squeezer module 312 may implement any one of various tools known in the art such as those listed in FIG. 3.

The embedded focused fact 304 and the question type 306 may be fed into a concatenator module 314. The concatenator module 314 may be configured to concenate the focused-fact 304 and the question type 306 and feed them into one or more layers of a bi-directional recurrent neural network (RNN) 310 implemented by the question generator 164.

Figure 4:
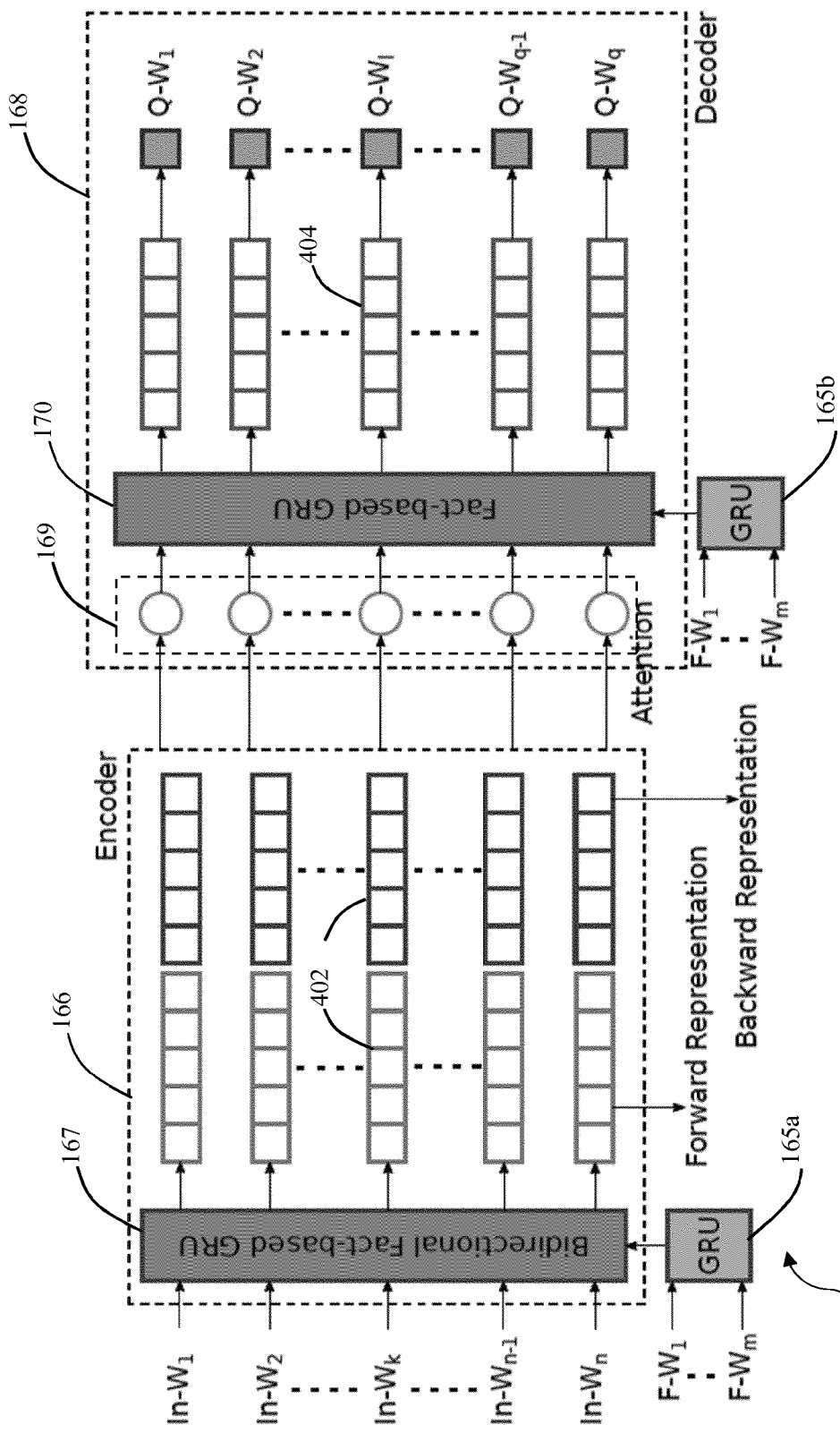
FIG. 4 illustrates recurrent neural network architectures used in one embodiment of the invention.

FIG. 4 illustrates an RNN 310 implemented by the question generator 164 in accordance with one embodiment. In the context of FIG. 4, In-$W_I$, F-$W_J$, and Q-$W_K$ stand for the $I^{th}$, $J^{th}$ and $K^{th}$ word of the input paragraph (received from the paragraph embedder 163), the focused fact, and the generated question, respectively. Also, n, m, and q are the length of the paragraph, the focused fact, and the generated question, respectively.

It is noted that the RNN 310 shown in FIG. 4 is only one embodiment, which is referred to as a "deep curious" RNN model. There may be several other types of RNN models that consider different types of input. These different models are discussed below.

The gated recurrent units 165a and 165b receive the same input ({F-$W_1$, F-$W_2$, ..., F-$W_m$}). The output of the second bidirectional fact-based GRU 167 may be the concatenation of forward and backward outputs of the GRU 165a and the output of the paragraph embedder 163.

That is, the bidirectional fact-based gated recurrent unit 167 receives the words of the input paragraph In-$W_1$, In-$W_2$, In-$W_k$, In-$W_{n-1}$ ..., In-$W_n$ and outputs the concatenation of the forward and backward representation of the input paragraph. The forward representation of an input word In-$W_k$ may refer to analyzing the word(s) in the supplied text by reading the words in order from left to right. The backward representation reverses the order and reads the word(s) backwards in order (right to left). Analyzing both representations recognizes the dependency between the words and allows for a better understanding of how words relate to one another. The second bidirectional fact-based GRU 167 then outputs sequences 402 for each input word In-$W_k$.

To compute the hidden state $h_t$, the encoder 166 performs the following calculations:

$$r_t = \sigma(W_r x_t + U_r h_{t-1} + F_r d_{enc}) \quad \text{(Eq. 1)}$$

$$z_t = \sigma(W_z x_t + U_z h_{t-1} + F_z d_{enc}) \quad \text{(Eq. 2)}$$

$$\hat{h}_t = \tan h(W x_t + U(r_t \odot h_{t-1})) \quad \text{(Eq. 3)}$$

$$h_t = (1 - z_t) h_{t-1} + z_t \hat{h}_t \quad \text{(Eq. 4)}$$

In the encoder-decoder model shown in FIG. 4, the encoder 166 reads the input sequence of word embeddings $X = (x_1, x_2, \ldots, x_T)$ obtained from the paragraph embedder 163 into to the sequence of embeddings $H = (h_1, h_2, \ldots, h_T)$, while the received focused fact received from the GRU 165a is used to compute the gating for all sequences.

Equations 1-4 may be referred to as the operational stages of the GRU 165a. W, U, F are weighting parameters, $x_t$ is the input at time t, $h_{t-1}$ is the state and the output of the second fact-based gated recurrent unit 167 at time t−1. $d_{enc}$ is the time-independent embedding of the fact that is extracted from the GRU 165a and is the same for all time sequences. $\odot$ is the element-wise product operation, $r_t$ and $z_t$ are the reset gate and the update gate at time t, respectively. $\hat{h}$ is the new candidate state at time t, and $h_t$ is the final state and output of the GRU 165a at time t.

Equation 1 calculates the reset gate and determines the importance of $h_{t-1}$ (the state at t−1) in calculating the summarization $\hat{h}_t$. Equation 2 calculates the update signal and determines how much of $h_{t-t}$ should be considered in the calculating the next state $h_t$ at time t. For example, if $z_t$ is approximately equal to 1, then $h_{t-1}$ is almost entirely copied to $h_t$. On the other hand, if $z_t$ is approximately equal to 0, then mostly the new memory $\hat{h}_t$ is forwarded to calculate the next hidden state.

Equation 3 calculates the new memory $\hat{h}_t$ which is the consolidation of a new input $x_t$ with the past hidden state $h_{t-1}$. This equation essentially combines a newly observed word with a previous state $h_{t-t}$ to summarize the new word in the context of the previous state. Finally, equation 4 calculates the final state $h_t$ which is the output of the gated recurrent unit 165a.

The functions executed by the decoder 168 are similar to equations 1-4 above and are:

$$r_t = \sigma(W_r x_t + U_r h_{t-1} + F_r d_{dec})$$ (Eq. 5)

$$z_t = \sigma(W_z x_t + U_z h_{t-1} + F_z d_{dec})$$ (Eq. 6)

$$\hat{h}_t = \tanh(W x_t + U(r_t \odot h_{t-1}))$$ (Eq. 7)

$$h_t = (1 - z_t) h_{t-1} + z_t \hat{h}_t$$ (Eq. 8)

The decoder 168 utilizes the focused fact (received from GRU 165b) in a similar manner as the encoder 166. The equations 5-8 are similar to equations 1-4 except $d_{dec}$ stands for the independent embedding of the focused fact that is extracted from the GRU 165b.

The decoder 168 is trained to predict the next word $y_t$ (referred to as Q-$W_t$ in FIG. 4) based on the context vector c from the encoder 166 and the previous predicted words $(y_t, \ldots, y_{t-1})$. The decoder 168 may define a probability over the prediction sequence $Y = (y_1, \ldots, y_T)$ by decomposing the joint probability that a particular sequence of words appears in the dataset into the order conditionals:

$$p(Y) = \Pi_{t=1}^T p(y_t | \{y_1, \ldots, y_{t-1}\}, c_t, d_{dec})$$ (Eq. 9)

In RNNs, each conditional probability is modeled as follows:

$$p(y_t | \{y_1, \ldots, y_{t-1}\}, c_t, d_{dec}) = f(y_{t-1}, s_t, c_t, d_{dec})$$ (Eq. 10)

where:

$$s_t = g(y_{t-1}, s_{t-1}, c_t, d_{dec}),$$ (Eq. 11)

$$c_t = q(\{h_1, \ldots, h_T\}, s_{t-1})$$ (Eq. 12)

and f, g, and q, are nonlinear and potentially multilayered functions, $s_t$ is the hidden state of the decoder 168 at time t, and $c_t$ is the context vector from the encoder 166 at time t which is generated based on the function q. The context vector $c_t$ is computed as a weighted sum of the outputs $H = (h_1, \ldots, h_T)$ from the encoder 166 using the equation:

$$c_t = \Sigma_{t=1}^T a_{ti} h_i$$ (Eq. 13)

where:

$$e_{ti} = \phi(s_{t-1}, h_i),$$ (Eq. 14)

$$a_{ti} = \frac{\exp(e_{ti})}{\sum_{j=1}^T \exp(e_{tj})}$$ (Eq. 15)

and φ is a feedforward neural network that is jointly trained with other components of the model.

Figure 5:
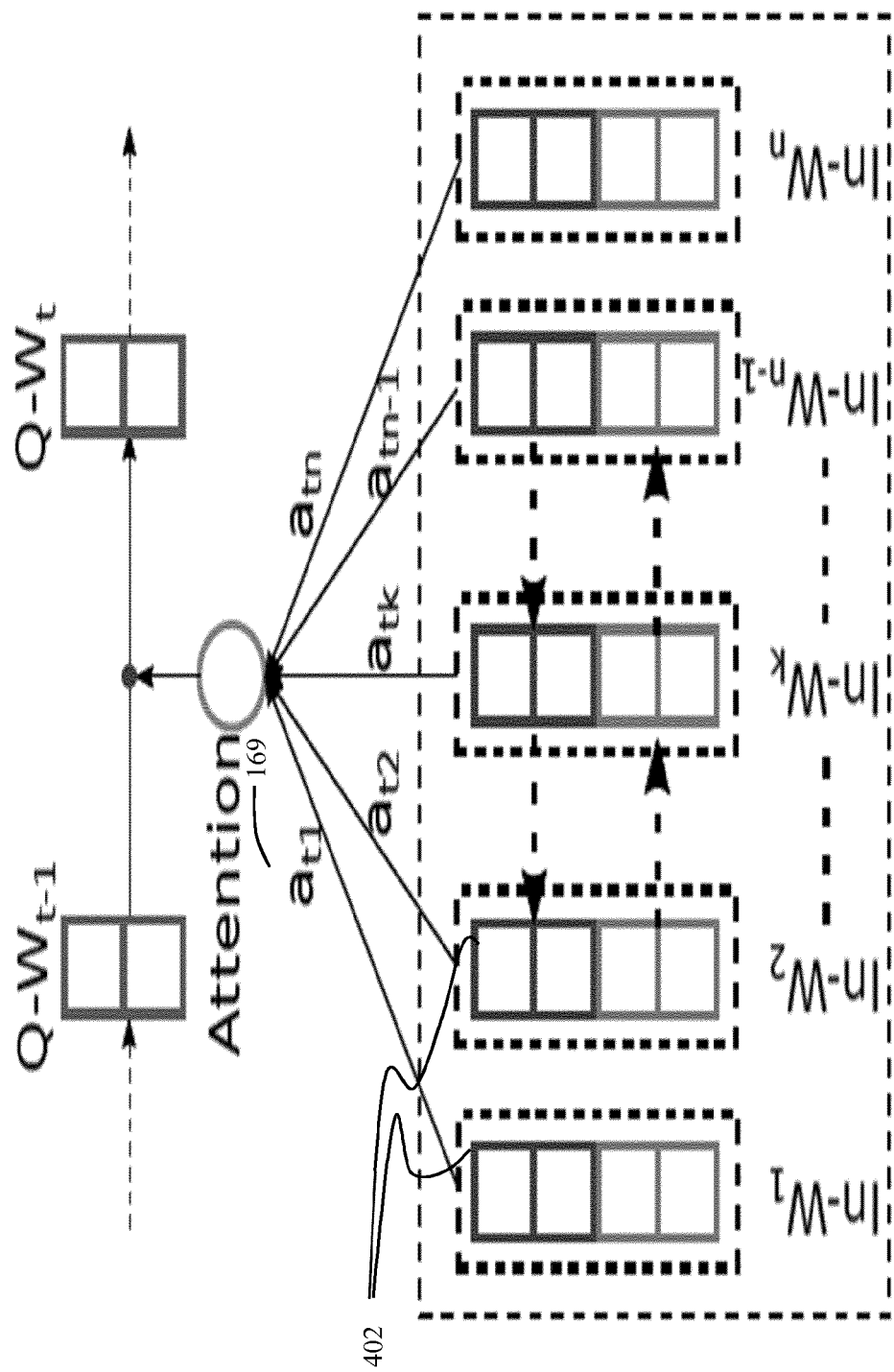
FIG. 5 illustrates the attention mechanism of FIG. 4 in accordance with one embodiment.

FIG. 5 illustrates the outputted concatenated sequences 402 of FIG. 4 being communicated to the attention generator 169 of FIG. 4. The attention generator(s) 169 may be configured to compute normalized weights for each sequence (i.e., hidden representation) outputted by the encoder 166.

Specifically, in order to generate the $i^{th}$ word of the question (Q-$W_t$) the attention generator 169 may compute the weight and importance of each encoder output according to the previous decoder hidden state using equation 14. Referring back to FIG. 3, this step may be performed by the softmax layer 314. The softmax function mitigates the effect of extreme values or outliers in a dataset without entirely removing them from the dataset.

Then, the attention generator 169 may normalize the computed weights for all sequences and communicate the normalized weights to the third fact-based GRU 170. The third fact-based GRU 170 may use the weighted sum of the encoder's hidden representations to generate a possible word for the question.

Referring back to FIG. 3, the output of the decoder 168, as well as the softmax layer 314, may be communicated to a language model 316. The language model 316 may be configured to at least assess proposed questions.

For example, for each word position in a sequence, the top k probable words will be communicated to the language model 316. The language model 316 may execute a beam search and/or an n-gram based language model (as well as any other suitable type of language model). The score of each word would be the multiplication of the softmax value (as determined by equation 14) and the n gram probabilities. Finally, the generated question may be supplied to a user via a user interface 140.

As mentioned previously, there may be several configurations of the recurrent neural networks. One implementation may be referred to as an "encoder-decoder" model. In this configuration, the encoder-decoder model may be built on a simple attention-based RNN encoder-decoder framework. The model does not use a factual statement and the RNN generates questions directly from the source text or paragraph.

Another implementation may be referred to as simply a "deep curious" model. The deep curious model may be a fact-based RNN that is built on an attention-based encoder-decoder framework. In this embodiment, the factual statement affects the gating of the encoder and the decoder RNN.

Another implementation may be referred to as an "augmented deep curious" model which is an augmented version of the deep curious model discussed above. In this type of model, the focused fact (i.e., the fact representation that is extracted for the decoder part, $d_{dec}$) also affects the attention generator of the network. In other words, the attention generator considers the factual statement in addition to the previous hidden state of the decoder and the hidden states of the encoder in accordance with equation 16 below.

$$e_{ti} = \phi(s_{t-1}, h_i)$$ (Eq. 16)

Another implementation may be referred to as a "simplified deep curious" model. This model is similar to the deep curious model discussed above, but uses one single fact representation for both the encoder and decoder.

Another implementation may be referred to as an "elementary deep curious" model. The elementary deep curious model is a fact-based RNN that is built on an attention-based encoder-decoder framework. However, the final output from the encoder that passes through the decoder is the element-wise product of the encoder output and the extracted fact representation from the encoder GRU ($d_{enc}$).

Another implementation may be referred to as a "separate deep curious" model. This model is similar to the elementary deep curious model. However, the separate deep curious model uses a separate GRU to extract a fact representation called $d_{elem}$. Then, the model uses $d_{elem}$ instead of $d_{enc}$ in the element-wise product.

Another implementation may be referred to as a "fact+ encoder-decoder" model. This model is similar to the encoder-decoder model discussed above, but its input is the concatenation of the factual statement and input paragraph.

Another implementation may be referred to as a "fact+ deep curious" model. This model is similar to the deep curious model, but its input is the concatenation of the factual statement and input paragraph.

Another implementation may be referred to as an "augmented+ deep curious" model. This model is similar to the augmented deep curious model, but its input is the concatenation of the factual statement and paragraph.

Figure 6:
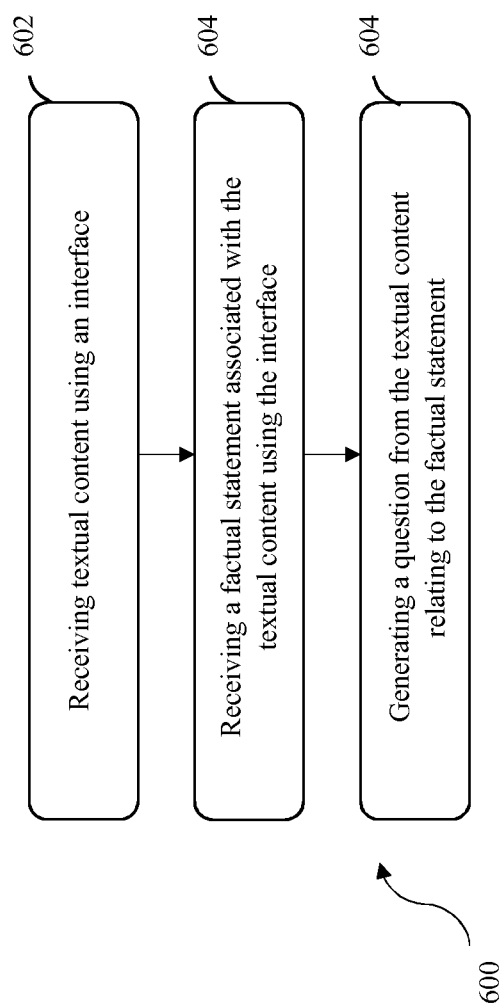
FIG. 6 depicts a flowchart of a method of generating a question from text in accordance with one embodiment.

FIG. 6 depicts a flowchart of a method 600 of generating a question from text in accordance with one embodiment. Step 602 involves receiving textual content using an interface. The textual content may be in the form of a paragraph of free text, for example, and may be received through any suitable interface such as those discussed previously.

Step 604 involves receiving a factual statement associated with the textual content using the interface. The factual statement or "focused fact" indicates to what the generated question should be directed. Accordingly, the question generator module 161 may suggest more relevant questions based on the desires of the user(s).

Step 606 involves generating, using a processor executing instructions stored on a memory to provide a question generator module, a question from the textual content relating to the factual statement. The processor may rely on convolutional neural networks that feed into one or more recurrent neural networks to find the most optimal combination of words to generate the most relevant question. Then, a generated question may be outputted to a user.

Figure 7:
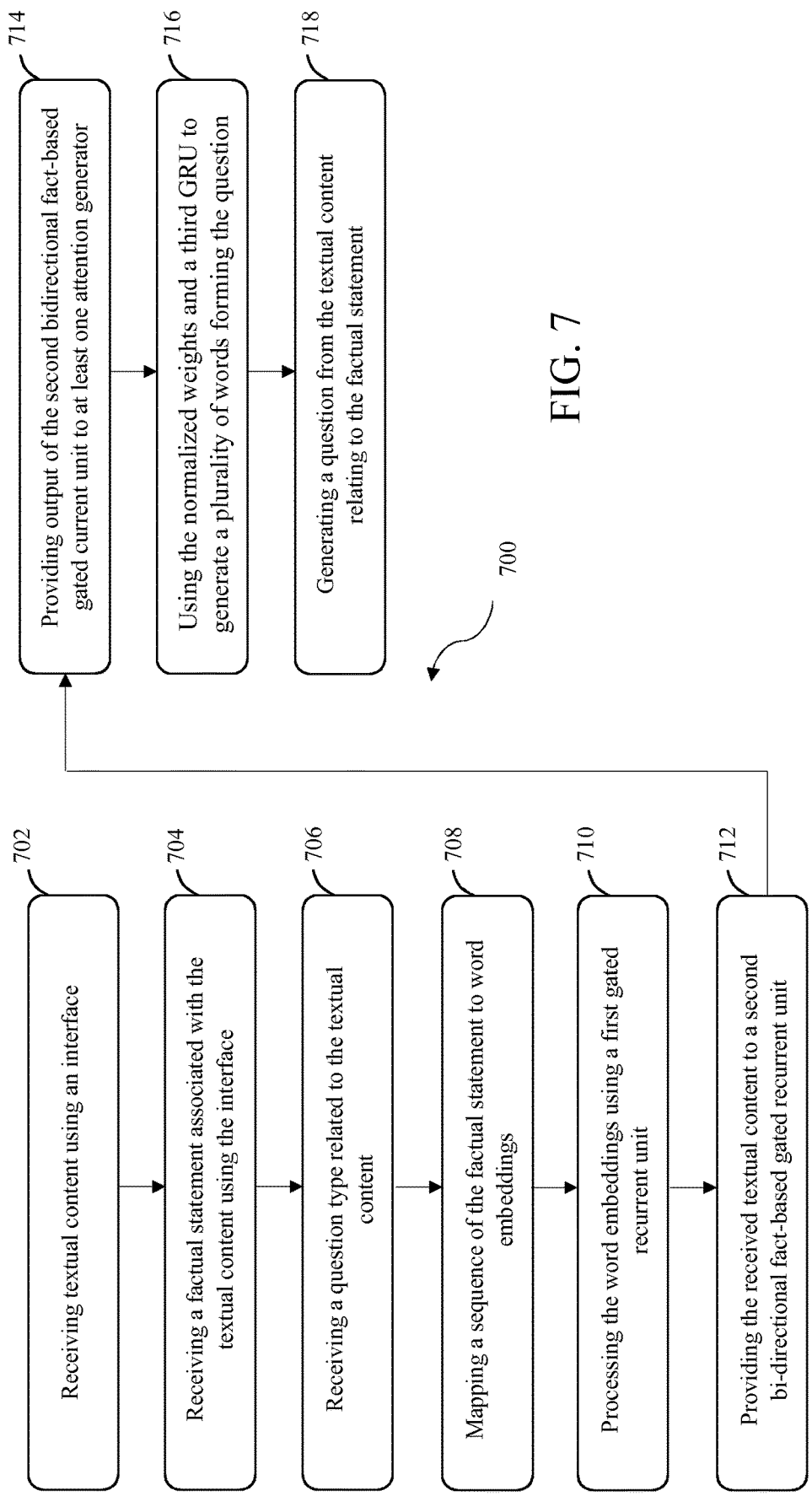
FIG. 7 depicts a flowchart of a method of generating a question from text in accordance with another embodiment.

FIG. 7 depicts a flowchart of a method 700 of generating a question from text in accordance with another embodiment. Steps 702 and 704 are similar to steps 602 and 604 of FIG. 6, respectively, and are not repeated here. Step 706 involves receiving a question type related to the textual content. The question type may refer to whether the generated question should be a "what" question, a "why" question, a "when" question, etc.

Step 708 involves mapping a sequence of the factual statement to word embeddings. In some embodiments the factual statement consists of a plurality of words. In these embodiments, the processor may execute instructions stored on a memory to provide a fact embedder module. The fact embedder module may be similarly configured to the fact embedder 162 of FIG. 2, for example, and may map the sequence of words of the factual statement to word embeddings.

Step 710 involves processing the word embeddings of the fact embedder module using a first gated recurrent unit to result in a set of computed weights. The first gated recurrent unit may be similar to the GRU 165a of FIG. 4, for example.

Step 712 involves providing the received textual content to a second bidirectional fact-based gated recurrent unit whose weighting is determined by the set of computed weights. The second bidirectional fact-based gated recurrent unit may be similar to the bidirectional fact-based gated recurrent unit 167 of FIG. 4, for example.

Step 714 involves providing output of the second bidirectional fact-based gated recurrent unit to at least one attention generator, each attention generator computing normalized weights for all sequences of the second gated recurrent unit. The attention generators may be similar to the attention generators 169 of FIG. 4.

Step 716 involves using the computed normalized weights and a third unidirectional fact-based gated recurrent unit to generate a plurality of words forming the question. The third unidirectional fact-based gated recurrent unit may be similar to the third fact-based GRU 170 of FIG. 4.

Finally, the method 700 ends with step 718, which involves generating a question relating to the factual statement using the words generated in step 716. The question may then be outputted to a user.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method of generating a question from text, the method comprising:
   receiving textual content using an interface;
   receiving a factual statement associated with the textual content using the interface; and
   generating, using a processor executing instructions stored on a memory to provide a question generator module including an encoder and a decoder, the question from the textual content relating to the factual statement, wherein the factual statement indicates to what the generated question should be directed, a language model is configured to assess proposed questions based upon output of the decoder and a softmax layer, and analysis of the textual content combines both a forward representation of the textual content and a backward representation of the textual content;
   wherein the softmax layer computes weight and importance of each output of the encoder according to a preceding hidden state of the decoder.

2. The method of claim 1, further comprising:
   receiving a question type related to the textual content using the interface.

3. The method of claim 1, wherein the factual statement consists of a plurality of words, and the method further comprises:
   mapping, using a processor executing instructions stored on a memory to provide a fact embedder module, a sequence of the plurality of words to word embeddings.

4. The method of claim 3, further comprising:
   processing the word embeddings of the fact embedder module using a first gated recurrent unit to result in a set of computed weights.

5. The method of claim 4, further comprising:
   providing the received textual content to a second bidirectional fact-based gated recurrent unit whose weighting is determined by the set of computed weights.

6. The method of claim 5, further comprising:
   providing output of the second bidirectional fact-based gated recurrent unit to at least one attention generator, each attention generator computing normalized weights for all sequences of the second gated recurrent unit.

7. The method of claim 6, further comprising:
   using the computed normalized weights and a third unidirectional fact-based gated recurrent unit to generate a plurality of words forming the question.

8. The method of claim 6, wherein the at least one attention generator utilizes the set of computed weights in determining the normalized weights.

9. The method of claim 5, wherein the second bidirectional fact-based gated recurrent unit comprises a convolutional neural network feeding forward into a plurality of recurrent neural networks.

10. A system for generating a question from text, the system comprising:
    an interface configured to receive textual content and a factual statement associated with the textual content; and
    a processor configured to execute instructions stored on a memory to provide a question generator module including an encoder and a decoder that is configured to generate the question from the textual content relating to the factual statement, wherein the factual statement indicates to what the generated question should be directed, a language model is configured to assess proposed questions based upon output of the decoder and a softmax layer, and analysis of the textual content combines both a forward representation of the textual content and a backward representation of the textual content;
    wherein the softmax layer computes weight and importance of each output of the encoder according to a preceding hidden state of the decoder.

11. The system of claim 10, wherein the question generator module is configured to receive input that is a concatenation of the factual statement and a paragraph.

12. The system of claim 11, further comprising:
    an attention generator configured to consider the factual statement and previous hidden states of the question generator module.

13. The system of claim 11, wherein the question generator module is configured to use a single representation of the factual statement for the encoder and the decoder.

14. The system of claim 10, wherein an input to the decoder is the element-wise product of an encoder output and an extracted fact representation from the encoder.

15. A non-transitory computer readable medium containing computer-executable instructions for performing a method of generating a question from text, the non-transitory computer readable medium comprising:
    computer-executable instructions for receiving textual content using an interface;
    computer-executable instructions for receiving a factual statement associated with the textual content using the interface; and
    computer-executable instructions for generating, using a processor executing instructions stored on a memory to provide a question generator module including an encoder and a decoder, the question from the textual content relating to the factual statement, a language model is configured to assess proposed questions based upon output of the decoder and a softmax layer, and analysis of the textual content combines both a forward representation of the textual content and a backward representation of the textual content;
    wherein the softmax layer computes weight and importance of each output of the encoder according to a preceding hidden state of the decoder.

* * * * *